Figure 2:
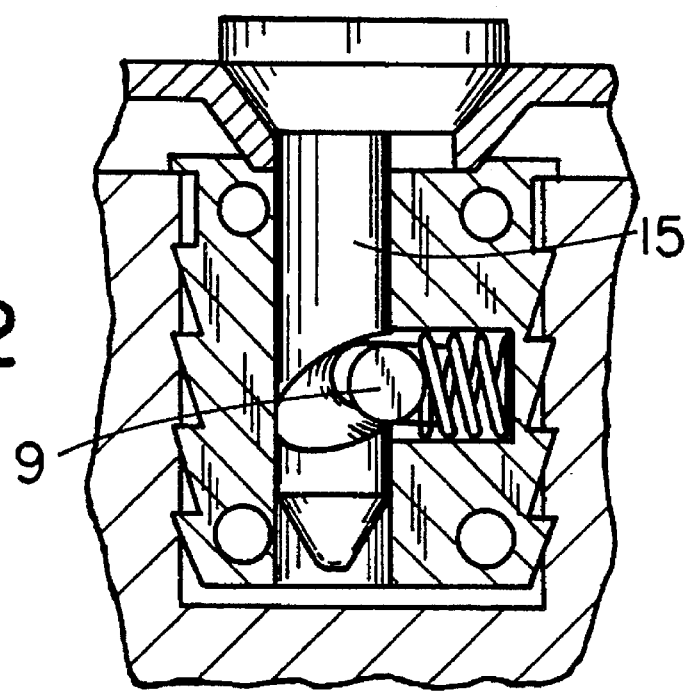

United States Patent [19]
Salice

[11] Patent Number: 5,642,960
[45] Date of Patent: Jul. 1, 1997

[54] FASTENING ELEMENT

[75] Inventor: Luciano Salice, Carimate, Italy

[73] Assignee: Arturo Salice S.p.A., Novedrate, Italy

[21] Appl. No.: 510,322

[22] Filed: Aug. 2, 1995

[30] Foreign Application Priority Data

Aug. 9, 1994 [DE] Germany ................. 44 282 13.3
Sep. 2, 1994 [DE] Germany ................. 44 313 22.5

[51] Int. Cl.$^6$ ............... F16B 1/04; F16B 13/00;
F16B 12/24; F16B 21/02
[52] U.S. Cl. ................. 403/407.1; 403/405.1;
403/328
[58] Field of Search ................. 403/22, 407.1,
403/409.1, 328, 329, 327, 405.1

[56] References Cited

U.S. PATENT DOCUMENTS

| | | | |
|---|---|---|---|
| 2,526,790 | 10/1950 | Wroblewski | 403/407.1 |
| 2,526,791 | 10/1950 | Wroblewski | 403/407.1 |
| 4,394,097 | 7/1983 | Horlacher | 403/405.1 X |
| 4,610,564 | 9/1986 | Vantouroux | 403/328 X |
| 4,826,345 | 5/1989 | Salice | 403/407.1 X |
| 4,898,493 | 2/1990 | Blankenburg | 403/407.1 |
| 4,923,321 | 5/1990 | Kriz | 403/407.1 X |

*Primary Examiner*—Anthony Knight
*Attorney, Agent, or Firm*—Morgan & Finnegan, LLP

[57] ABSTRACT

A fastening element with a dowel-like bushing which can be fixed in a bore is described. In the axial bore of the bushing there is a retaining pin that can be urged into the bore. The pin can fix a member that is to be fastened between its broadened head having a slot, or a cross-recess and the bushing. The shank of the retaining pin is provided with at least one transversely extending groove into which, in the pressed-in state of the retaining pin, a spring-loaded snap-in locking element engages and is guided in a cross-slidable manner in the bushing and is forced back into its released position by turning the retaining pin.

20 Claims, 9 Drawing Sheets

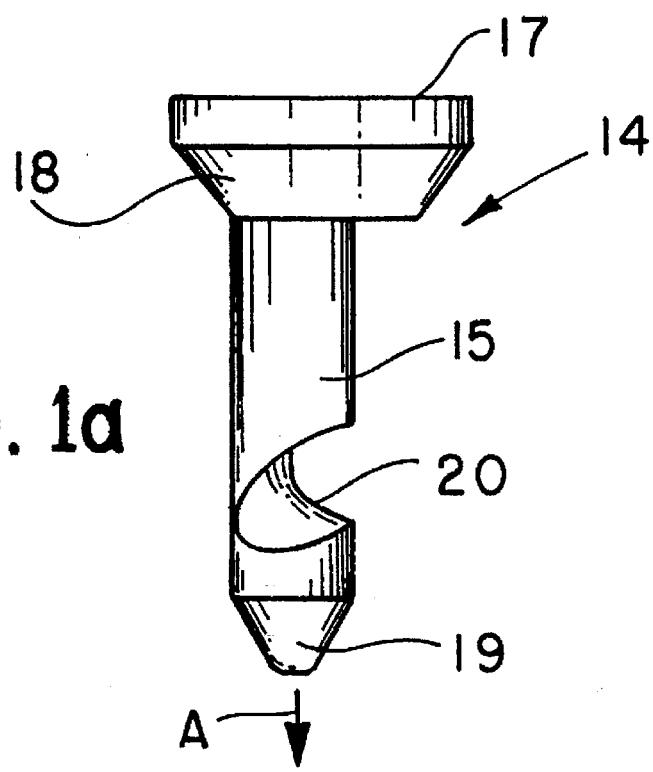
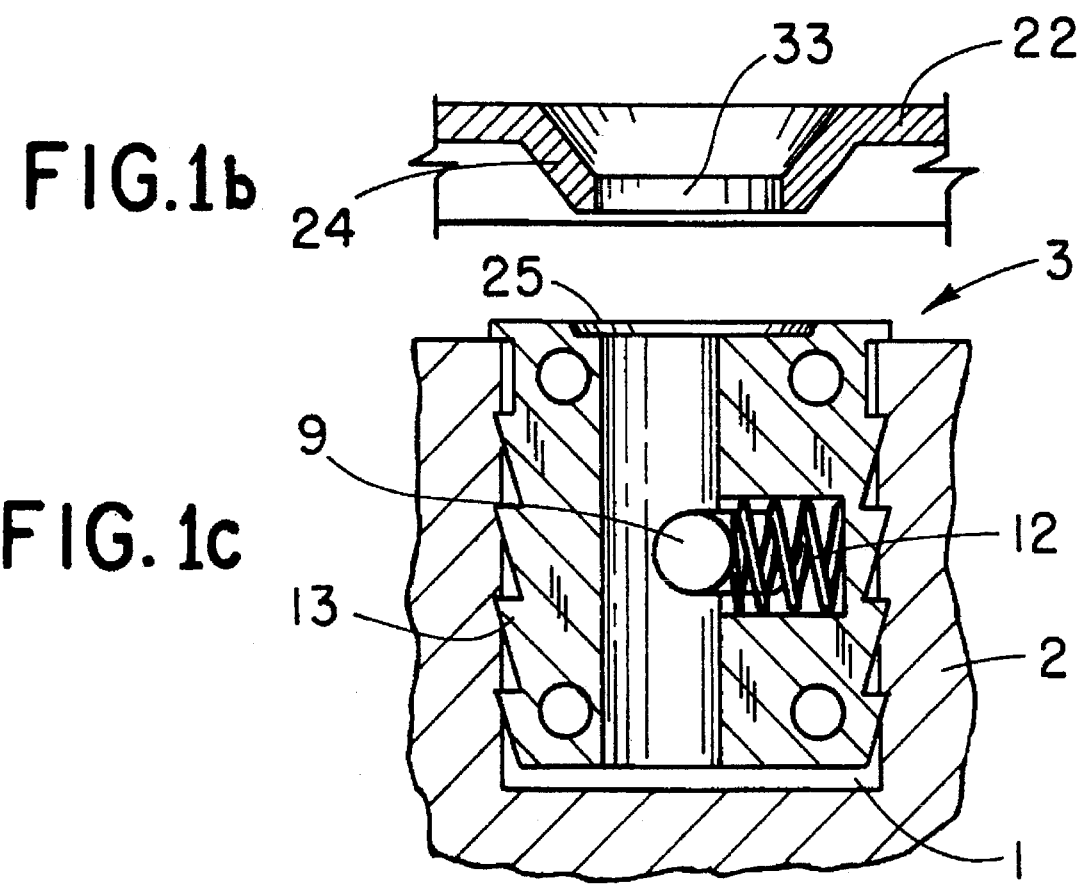

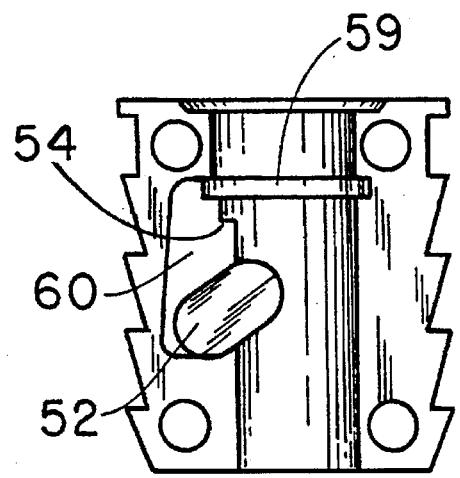
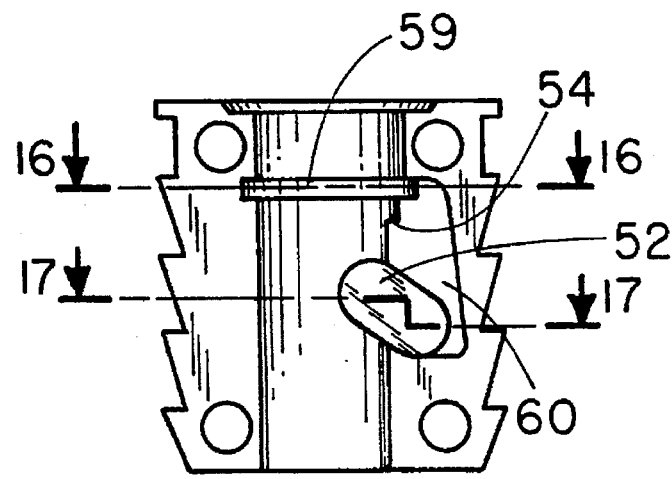
FIG. 14  FIG. 15
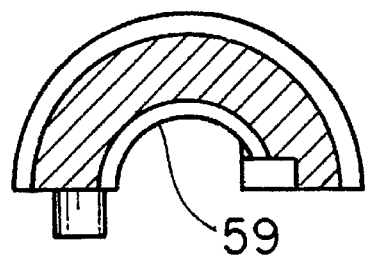
FIG. 16
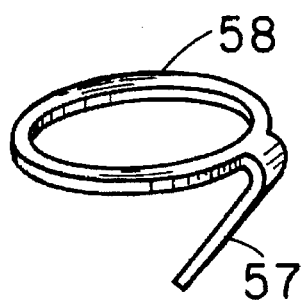
FIG. 18
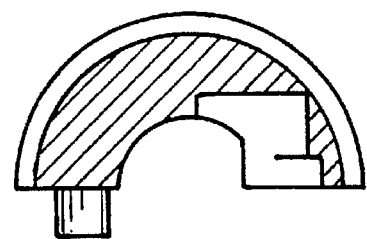
FIG. 17

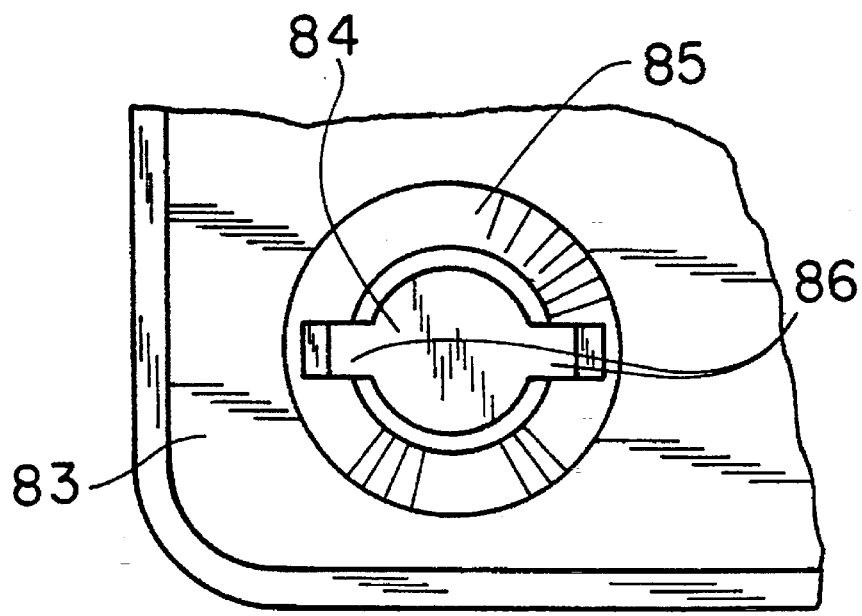
FIG. 22
FIG. 23
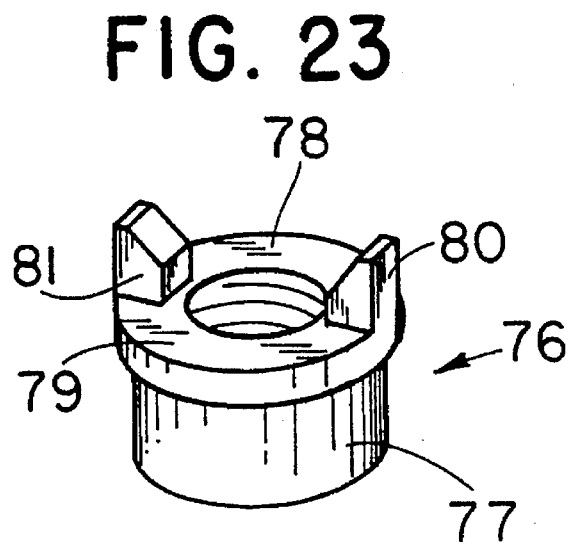
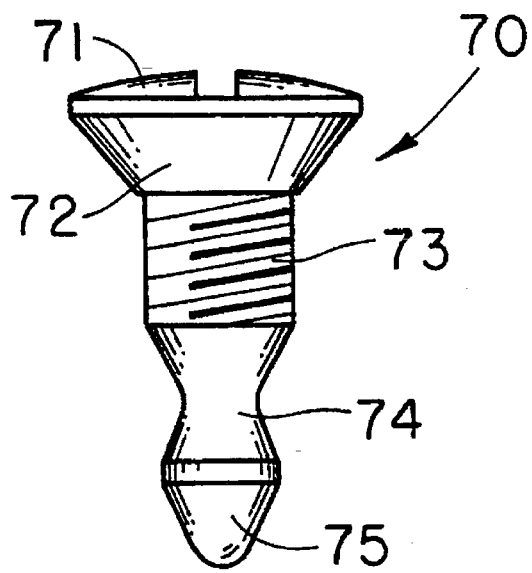
FIG. 24

FASTENING ELEMENT

The invention refers to a fastening element with a dowel-like bushing which can be fixed in a bore, for instance in a bore of a piece of furniture, wherein in the axial bore of the bushing a retaining pin is supported which can be urged thereinto and which can fix a member to be fastened, preferably a fitting, between its broadened head having a slot or a cross-recess and the bushing.

There are known various types of such fastening elements which can quickly and easily be mounted by hand or by using only simple tools. Therein the retaining pin is anchored in the dowel bushing either in a force-locking manner and/or in a form-locking manner. In known fastening elements in which the dowel bushing is held in its bore in a force-locking manner, either a large force for urging apart the bushing is required or only a low stability of the connection can be achieved. In known fastening elements in which the retaining pin is additionally anchored in the dowel bushing in a form-locking manner, close manufacturing tolerances must be observed for often complex types of fastening elements.

Therefore it is an object of the present invention to provide a fastening element of the kind indicated above which has a compact construction and permits an easy, secure and quick mounting and can also be released again in a simple and quick manner without requiring any special tools.

According to the invention said object is solved for a fastening element of the generic type in that the shank of the retaining pin is provided with at least one substantially transversely extending groove into which, in the pressed-in state of the retaining pin, a spring-loaded snap-in locking element engages which is guided in a cross-slidable manner in the bushing and which is forced back into its released position by turning the retaining pin.

Hence, the fastening element according to the invention can be mounted easily and quickly due to the fact that the retaining pin is pressed into the axial hole of the dowel bushing in a position in which its transverse groove faces the snap-in locking element, until the snap-in locking element engages the transverse groove. By a simple turning of the retaining pin by means of a screwdriver through approximately 80°, the snap-in locking element can be pressed out of the lock-in groove so that the retaining pin can be pulled out of the bore of the dowel bushing for releasing the connection.

Advantageously, the snap-in locking element consists of a transverse pin guided in a slot-like, substantially radial guideway of the dowel bushing. Advantageously, the guideway intersects a blind hole being open towards the bore, in which a compression spring is held which, on the one hand, rests on the bottom of the blind hole and, on the other hand, on the transverse pin.

Advantageously, the guideway inclines from the section of the center axis of the bore of the dowel bushing towards the end of the bushing.

In a further aspect of the invention the base of the transverse groove of the retaining pin is curved in an inclined manner in its direction of rotation for opening. Through said curvature the transverse pin is urged back out of the transverse groove with increasing lever arm so that the release of the connection can be obtained with a reduced expenditure of force.

Advantageously, the transverse groove extends in a spiral-shaped and inclined manner towards its end with the curved base. By said design of the transverse groove the retaining pin is slightly lifted out of the bore during the turning thereof into its opening position so that in its released position it can more easily be pulled out of the bore of the dowel bushing.

In a further aspect of the invention the axial bore extends eccentrically to the center axis of the dowel bushing, the shank of the retaining pin is correspondingly arranged eccentrically at the head formed as a flush head, and the fastening bore of the member to be fastened is provided with a reduced edge formed complementary to the truncated lower part of the flush head. Therein the eccentricities of the shank to the head and the bore of the dowel bushing are coordinated with each other such that the head can only be pressed into the reduced edge of the fastening bore when the retaining pin is in a position in which the transverse pin can come into engagement with the transverse groove. When now the head is turned for the purpose of releasing, the head is not locked-up in the cavity formed by the reduced edge of the fastening bore, as the truncated bevellings of the head and of the reduced edge are coordinated with the oblique course of the transverse groove of the retaining pin so that during turning the pin out of the lock, the truncated jacket of the head substantially rolls off on the complementary formed edge. Advantageously the dowel bushing being separated in an axial center plane consists of two mirror-inverted parts connected by a tenon-bore joint. The two parts are preferably made of injection moulded parts made of plastic material so that the desired contours including the outer serrated profile can be formed in an exact manner.

The transverse groove of the retaining pin is preferably narrowed towards its base so that given manufacturing tolerances are compensated and the retaining pin is held in its locked position free from backlash. The narrowing can be effected in that the side flanks of the groove converge towards the base thereof, the groove being broader in its opening section and narrower in its base than the diameter of the snap-in pin.

According to a second embodiment of the snap-in connection according to the invention the snap-in pin is held rotatably but undisplaceably in axial direction in a jacket partially surrounding it which is provided with a cutout uncovering the transverse groove of the snap-in pin and with a stop by means of which it is held stationary at a counterstop of the bore of the dowel bushing. In this development it is ensured by means of the stop and the counterstop that only in the correct turning position the snap-in pin can be pressed into the bore of the dowel bushing for its engagement with the snap-in locking element or the transverse pin so that the bore of the dowel bushing can also be arranged in the axis thereof.

Advantageously the stop is formed by a cut in the jacket following the cutout, extending freely downwards and being carried out in a plane parallel to the pin axis.

The counterstop may consist of a chord-like step arranged in the bore of the dowel bushing.

Advantageously a resilient leg bent off a ring held in a ring groove of the bore of the dowel bushing acts upon the transverse pin.

The jacket can be connected with the retaining pin in a rotatable but axially stationary manner in that it is provided with an annular bead at the inside of its through-hole which engages a ring groove of the retaining pin.

In a further aspect of the invention the head of the pin is provided with a radial extension the lateral step-like edges of which form stops for a counterstop of the jacket. Therein the stops and counterstops are coordinated with each other such that depending on the interacting stops the pin is either in a position in which it can come into a locking engagement with the snap-in locking element in the dowel bore or in its released (unlocked) position.

According to a third embodiment of the invention the shank of the retaining pin is provided with a ring groove into which in the pressed-in state of the retaining pin at least one spring-biased snap-in locking element snaps in which is guided in the dowel bushing so that it is substantially displaceable in transverse direction, the shank of the retaining pin is provided with a thread above the ring groove and together therewith is screwed into a bushing provided with a female thread and being held stationary with respect to the edge of the bore of the member to be fastened. Also in this fastening element according to the invention the snap-in pin can be locked in the dowel bushing by simply pressing it thereinto. The snap-in pin is already premounted at the member to be fastened, since the edge of the fastening bore is located between the head of the retaining pin and the threaded bushing screwed thereonto. For releasing the snap-in connection the pin is unscrewed from the threaded bushing so that the retaining pin with its ring groove is removed from the snap-in locking element.

Advantageously, the dowel bushing is provided with two guideways extending obliquely outwards towards the end of the bushing, wherein the dowel bore consists of a blind hole and a compression spring is clamped in between the base of the blind hole and the two transverse pins.

The threaded bushing may be provided with a reduced upper collar which rests upon a respective annular step of the dowel bore during releasing or unscrewing the retaining pin from the threaded bushing.

The threaded bushing may be held stationary with respect to the member to be fastened in that at its upper end it is provided with at least one projection which engages a respective edge recess of the fastening bore of the member to be fastened.

Figure 3:
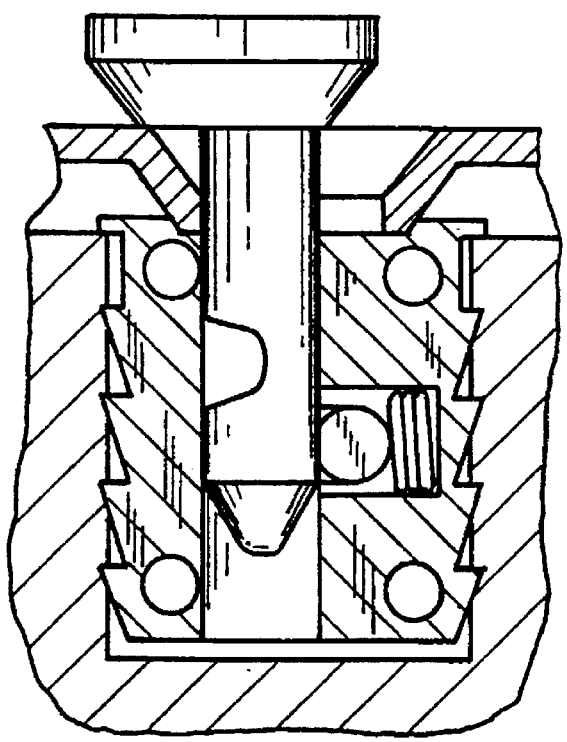
Figure 4:
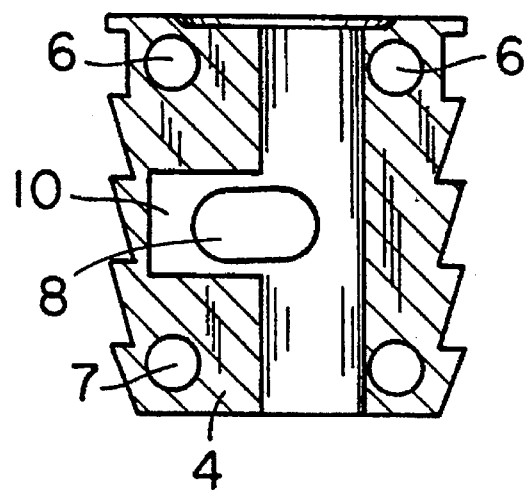
Figure 5:
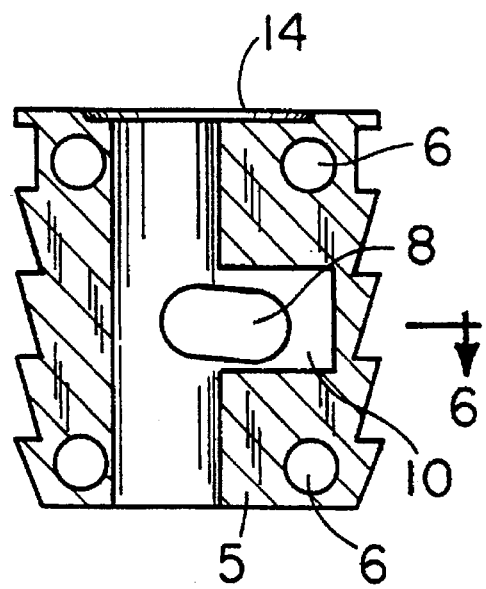
Figure 7:
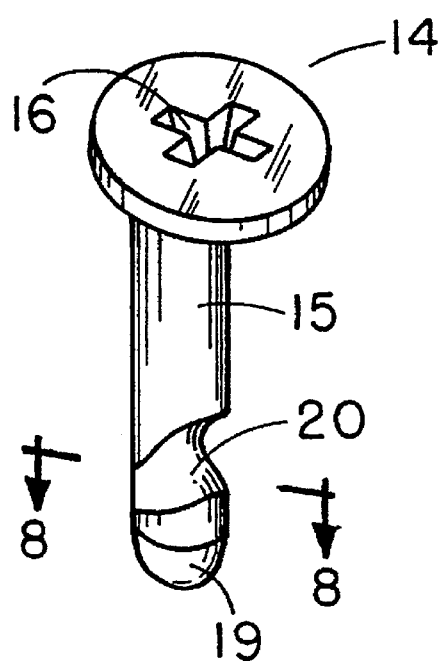
Figure 6:
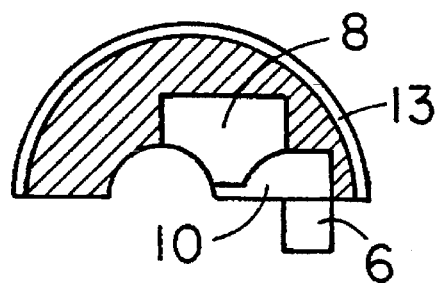
Figure 8:
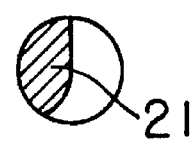
Figure 9:
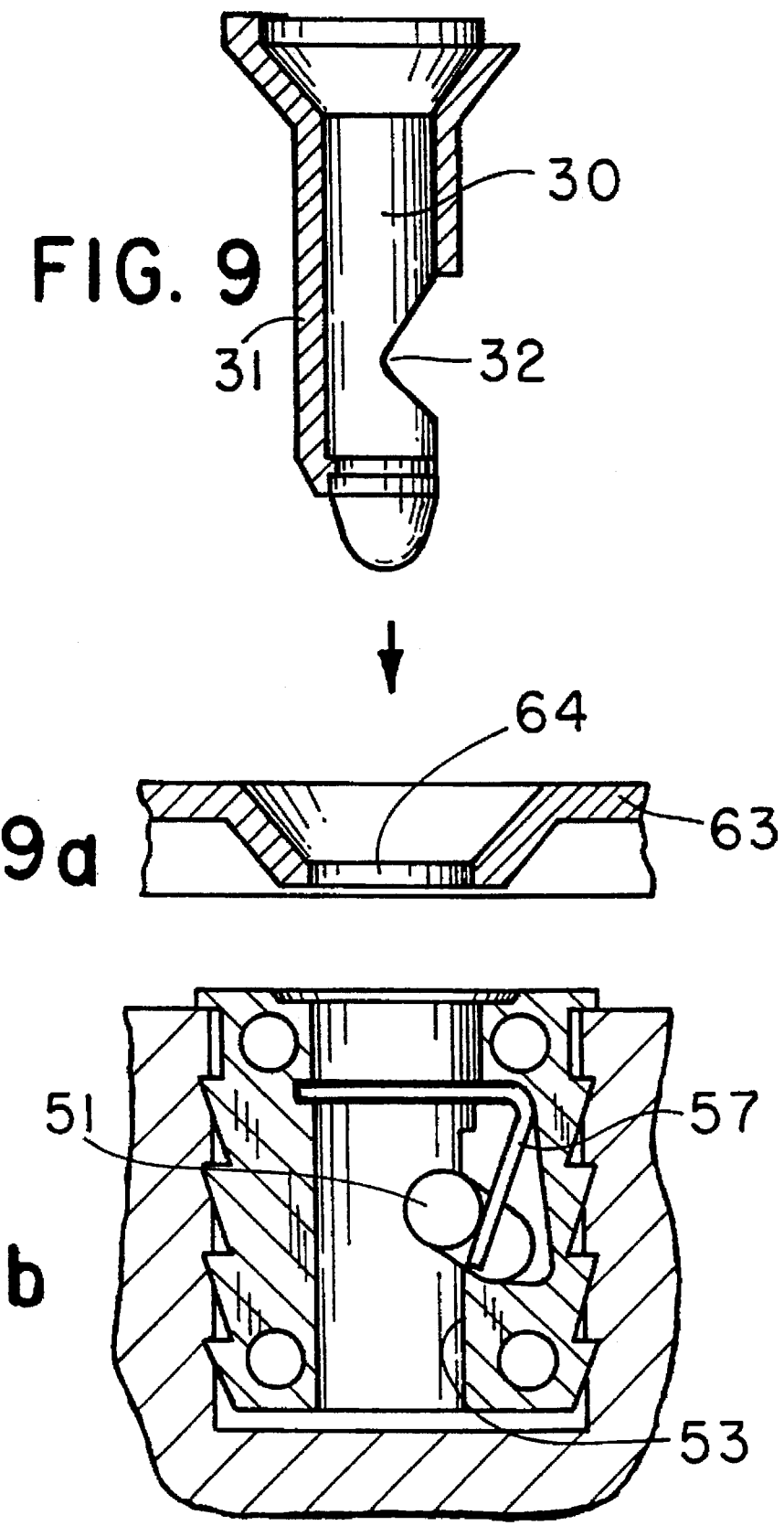
Figure 10:
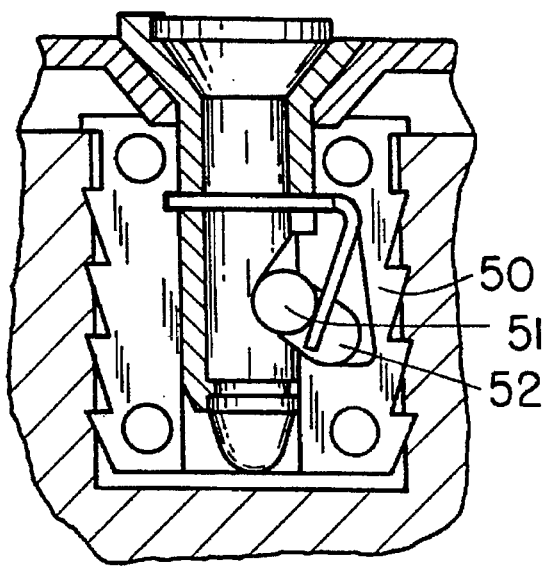
Figure 12:
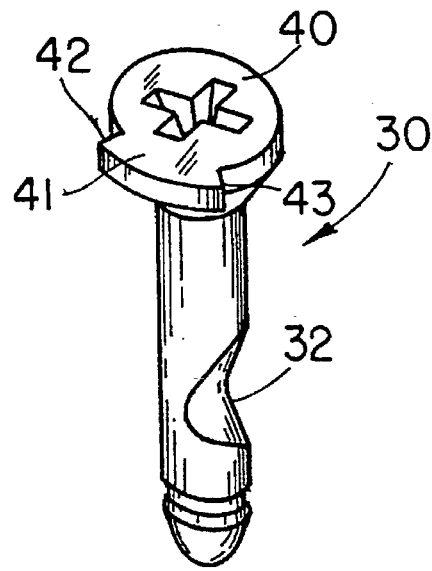
Figure 11:
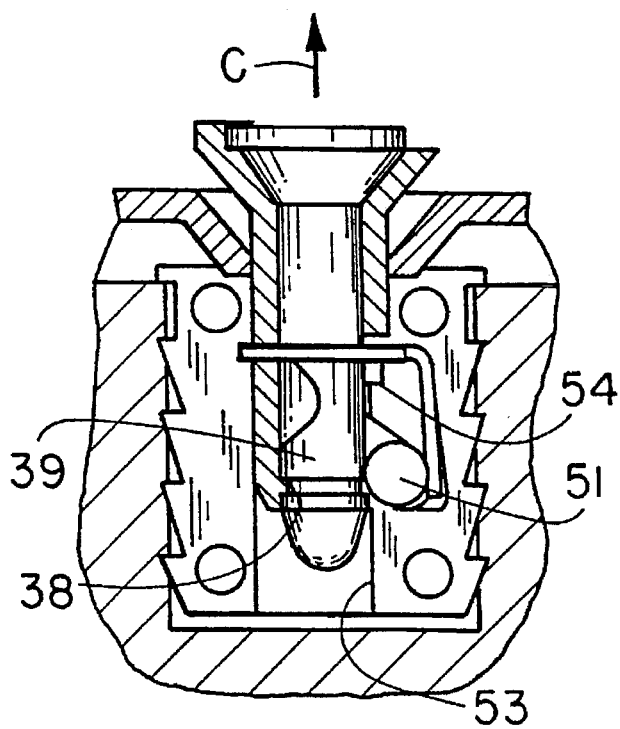
Figure 13:
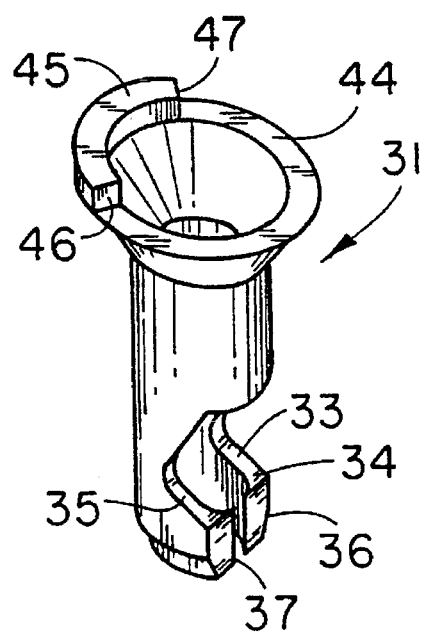
Figure 19:
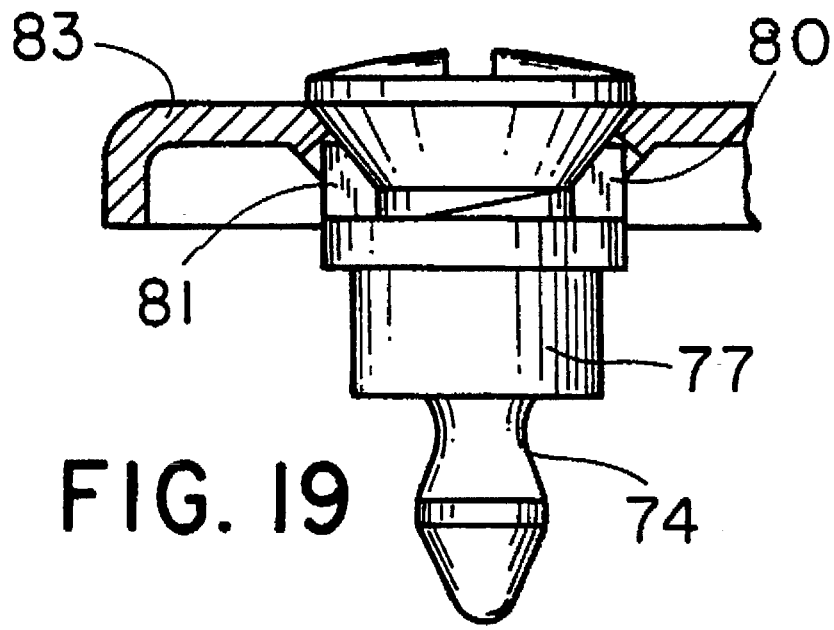
Figure 19A:
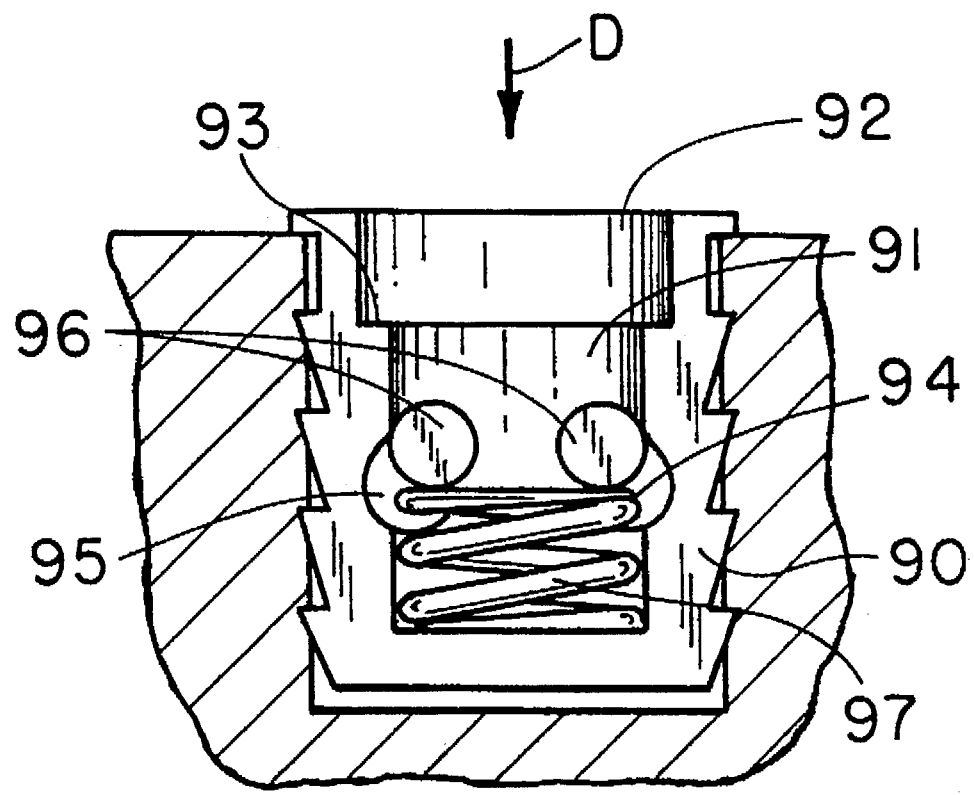
Figure 20:
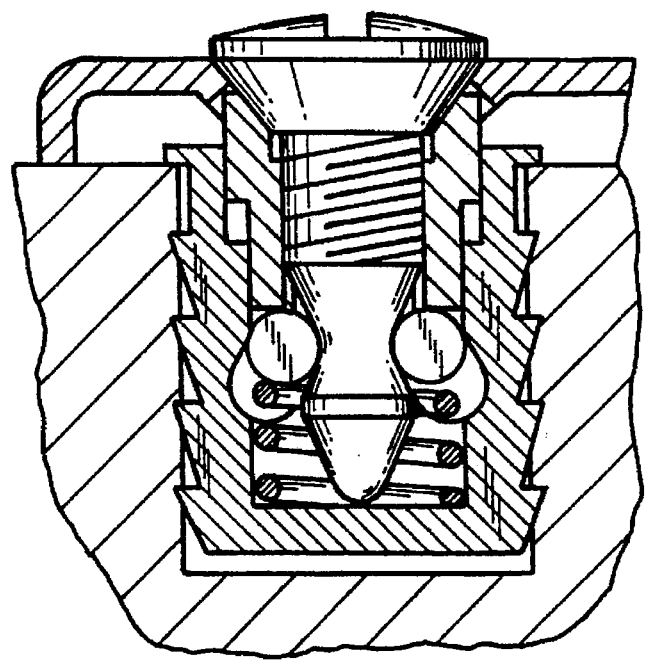
Figure 21:
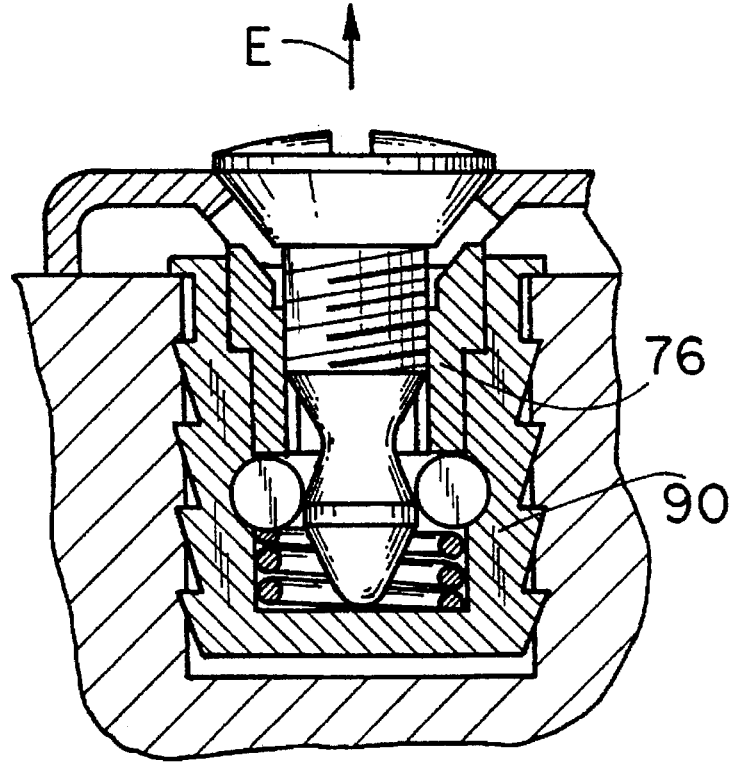

Embodiments of the invention will now be explained in detail in the following by means of the drawings in which FIG. 1 shows a first embodiment of a fastening element in a disassembled state of its parts, partially in section, FIG. 2 is a longitudinal section through the fastening element according to FIG. 1 in its snapped-in state, FIG. 3 shows a longitudinal section through the fastening element of FIG. 1 in the released state of the engagement, FIG. 4 and FIG. 5 are views of the separating planes of the mirror-inverted parts of the dowel bushing of the fastening element of FIG. 1, FIG. 6 shows a cross-section through the part of the dowel bushing as shown in FIG. 5 along line 6—6, FIG. 7 is a perspective view of the retaining pin, FIG. 8 is a section through the retaining pin along line 8—8 of FIG. 7, FIG. 9 is a sectional view of a second embodiment of a fastening element in a disassembled state of its individual parts, FIG. 10 shows a sectional view of the fastening element of FIG. 9 in its locked state, FIG. 11 is a sectional view of the fastening element of FIG. 9 in its released state, FIG. 12 shows a perspective view of the retaining pin released from its jacket, FIG. 13 is a perspective view of the jacket of the retaining pin, FIG. 14 and FIG. 15 are views of the two parts joined to form the dowel bushing in their parting plane, FIG. 16 is a sectional view of the part of FIG. 15 along line 16—16, FIG. 17 is a sectional view of the part of FIG. 15 along line 17—17, FIG. 18 is a perspective view of the resilient leg with retaining ring, FIG. 19 is a sectional view of a third embodiment of a fastening element in a disassembled state of the snap-in parts, FIG. 20 shows a sectional view of the fastening element of FIG. 19 in the snapped-in state, FIG. 21 is a sectional view of the fastening element of FIG. 19 during the release of the snap-in joint, FIG. 22 is a bottom view of the fastening bore of the member to be fastened, FIG. 23 is a perspective view of the threaded bushing, FIG. 24 is a side view of the retaining pin of the fastening element of FIG. 19.

The fastening element shown in FIG. 1 through 8 consists of a dowel bushing 3 inserted into a bore 1 of a piece of furniture 2 or the like, said dowel bushing 3 being composed of two mirror-inverted halves 4, 5. The halves 4, 5 of the dowel bushing dividing the dowel bushing 3 in a longitudinal center plane consist of injection moulded parts made of plastic material. Each half is provided with two tenons (pins) 6 and two bores 7 which are used for assemblying and holding together of the dowel bushing, when the transverse pin 9 has been inserted in the slot guideway 8 and the compression spring 12 has been inserted in the radial blind hole 10 extending into the dowel bore 11, said pressure spring 12 being supported with its one end on the base of the blind hole 10 and with its other end on the transverse pin 9. The axial dowel bore is arranged eccentrically to the dowel axis. In order to ensure a good anchorage in the bore 1, the dowel bushing 3 is provided with a serrated profile 13 on its outer circumference.

The retaining pin 14 consists of a cylindrical shank portion 15 carrying a head 17 provided with a cross-recession 16. The head 17 has a truncated sunk part 18 between an upper disk-like portion. At the lower smaller circular area of the truncated part 18, the shank 15 is added in accordance with the eccentricity of the dowel bore 11. The shank 15 has a cone-like tip 19 and above thereof a transverse groove 20 which extends in an oblique or spiral manner towards the tip 19. Towards its end the base 21 of the groove is inclined slightly downwards, as can be seen in FIG. 18.

The member 22 to be fastened is provided with a fastening bore 23 having an inward flange, wherein the bore edge 24 is bevelled like a channel so that it matches with the truncated flush head 17, 18. The dowel bushing 3 is provided with a flat and circular recess 25 at its upper end which is used for centering the lower edge of the flanged fastening bore.

For locking the fastening element, the retaining pin 14 is pressed through the fastening bore 23 into the dowel bore 11 in the direction of arrow A, so that the transverse pin 9 engages the transverse groove 20 in a snap-like manner in the locking position as illustrated in FIG. 2. Due to the eccentricity of the dowel bore 11 and of the shank 15 relative to the retaining pin 14, during insertion of the retaining pin the transverse groove 20 thereof is located on the side facing the transverse pin 9.

For opening the fastening element the locking pin 14 must be turned with a screw driver in counterclockwise direction so that the retaining pin is screwed out of the dowel bore 11 due to the spiral design of the groove 20, wherein the head of the retaining pin 15 is not blocked in the recess of the fastening bore, since the jacket of the truncated portion 18 of the flush head rolls off from the wall of the edge of the fastening bore and simultaneously comes out of the dowel bore in the direction of arrow B. When the transverse pin is located on the cylindrical jacket of shank 15 of the locking pin 14, it can be pulled out from its position as shown in FIG. 3 in the direction of arrow B.

The second embodiment of the fastening element which is shown in FIG. 10 through 17 differs from the first one substantially only in that the snap-in pin 30 is arranged rotatably but stationary in an axial direction within a jacket 31 partially enclosing it. Jacket 31 consists of a tube-like part the inner contours of which are substantially adapted to the outer contours of the retaining pin 30. The retaining pin 30 is provided with a transverse groove 32 the side flanks of which are narrowed towards the rounded base thereof. Said transverse groove extends diagonally to the center axis of retaining pin 30. In the section of the transverse groove 32 the jacket 31 is provided with a cutout 33 uncovering it. In a plane extending in parallel to the plane of the transverse center line of the cutout 33, the jacket 31 is provided with a cut (free cut) extending from the lower end of the jacket in the manner as shown in FIG. 13 into the cutout 33 so that two lower legs 34, 35 are formed the fronts 36, 37 of which form stop surfaces. The jacket 13 is provided with an inwardly projecting bead 38 at its lower section in the manner illustrated in FIG. 11, said bead 38 engaging a ring groove 39 of the retaining pin 30 such that the retaining pin 30 is connected with the jacket 31 so that it is rotatable but stationary in axial direction.

The flush head 40 of the retaining pin 30 which is provided with a truncated section has a sector-shaped radial extension 41. Said extension 41 has step-like stop areas 42, 43 on its two sides. On its annular front 44, the head portion of the jacket is provided with an axial extension 45 in the manner as shown in FIG. 13 which extends along the circumferential section as to be seen in FIG. 13. Also said extension has two step-like stop areas 46, 47 cooperating with the stop surfaces 42, 43 of the retaining pin. When the stop surfaces of one side contact each other, the retaining pin 30 is in its locking position as shown in FIG. 10, while the retaining pin is in its opening position illustrated in FIG. 11, when the two other stop surfaces abut each other.

On its side at which the oblong hole 52 receiving the transverse pin 51 is located, the dowel bushing 50 is provided with a chord-like recess 53 extending from step 54 above the oblong hole 52 towards the lower end of the dowel bore. Said recess 53 forming a plane stop surface constitutes the counterstops for the stop surfaces 36, 37 of jacket 31 formed by the free cut.

Due to the recess 53 cooperating with stop surfaces 36, 37, the angular position of jacket 31 in the dowel bore in which the retaining pin can come into engagement with the transverse pin 51 is fixed. The locking and releasing positions of retaining pin 30 in jacket 31 are determined by stops 42, 43 and 46, 47.

The transverse pin 51 situated in the slant guideway 52 is resiliently acted upon (pressed) by leg 57 bent off the retaining ring 58 in the manner to be seen in FIG. 18. Retaining ring 58 is held in a ring groove 59 of the dowel bushing 50.

The arrangement of said ring groove 59, of the slant guideway 52 and of the free cut 60 for the movement of the resilient leg 57 in the dowel bushing is illustrated best by means of the latter's mirror-inverted halves as shown in FIGS. 14 and 15.

For mounting the fastening element in the manner as shown in FIG. 9, the retaining pin enclosed by the jacket 31 is pressed through the fastening bore 64 of the member 63 to be fastened into the dowel bore of the dowel bushing in a position in which the transverse groove 32 is located in the cutout 33 of jacket 31. As the jacket 31 can only be pressed into the dowel bore in an angular position relative thereto in which the stop areas 36, 37 slide along the recess 53, it is guaranteed that the snap-in pin 51 falls into the snap-in groove in a locking manner during the pressing-in process. The snapped-in position is shown in FIG. 10.

For releasing the snap-in connection, the snap-in pin 30 is turned about 180° by a screwdriver for recessed-head screws into the position as shown in FIG. 11 in which the respective stops 42, 46 fix the position of the snap-in pin 30 in the jacket 31 so that the snap-in pin together with its jacket 31 can be removed from the dowel bore in the direction of arrow C in FIG. 11.

In the embodiment of the fastening element according to FIG. 19 through 24, the snap-in pin 70 is provided with a shank below its flush head 71 being provided with a truncated section, said shank having an upper portion being provided with a thread 73, a portion following thereto and being provided with a ring groove 74, and a cone-shaped tip 75. The shank portion being provided with thread 73 is screwed into a threaded bushing 76 consisting of a lower cylindrical portion 77 and an upper angular collar-like or flange-like broadening 78 having two radial projections 80, 81 being offset by 180° on its front side 79, the inner sides of which are inclined in accordance with the truncated part 72 of the flush head 71. The member 83 to be fastened is provided with a fastening bore 84 the rim 85 of which is reduced corresponding to the truncated section 72 of head 71 and is provided with two cutouts 86 being opposite to each other into which the projections 80, 81 engage in the manner to be inferred from FIG. 19.

For premounting the fastening device, the threaded shank portion 73 of the retaining pin 70 is screwed into the threaded bushing 76 by intermediate positioning of member 83 to be fastened so that the member 83 to be fastened is fixed between head 71 and threaded bushing 76.

Dowel bushing 90 is provided with a central blind bore consisting of a lower longer portion 91 with a smaller diameter and an upper shorter portion 92 with a larger diameter so that an annular step 93 is formed between said two portions. The dowel bushing is provided with two mutually opposite, obliquely extending oblong holes 94, 95 in which retaining pin 96 is guided. The oblong holes 94, 95 extend towards the end of the dowel bushing 90 obliquely outwards. Between the base of the blind hole 91 forming the dowel bore and the two retaining pins 96 a compression spring 97 is clamped in the manner as illustrated in FIG. 19 which loads the two retaining pins 96 in the direction towards their position in which they are pushed towards each other.

The retaining pin 70 premounted at the member 83 to be fastened in the manner as shown in FIG. 19 is pressed into the dowel bore in the direction of arrow D for mounting the fastening element, until the two retaining pins 96 engage in a snapping manner in the ring groove 74. The locked position is shown in FIG. 20.

For releasing the snap-in connection the retaining pin 70 is turned by means of a screwdriver for recessed-head screws in the manner to be inferred from FIG. 21 in the counterclockwise direction so that the threaded bushing moves downwards from the locked position as shown in FIG. 20 towards the base of the bore of dowel bushing 90 into the position as shown in FIG. 21 and thereby pushes the two retaining pins 96 by means of its lower annular front into their opening position in the end section of the two oblong holes 94, 95. In the position as shown in FIG. 21 the release position is substantially reached in which the member 83 to be fastened can be removed together with retaining pin 70 and the threaded bore 76 in the direction of arrow E.

What we claim is:

1. A fastening element for a member, the element having a dowel-like bushing which can be fixed in a bore formed in the fastening element wherein the bushing has an axial bore, an axially rotatable retaining pin having a slotted broadened head, the pin being supported in the bushing's axial bore and which can fix the member to be fastened between the slotted broadened head and the dowel bushing, comprising a shank for the retaining pin, said shank being provided with at least one substantially transversely extending groove having a base, a spring-loaded snap-in locking element for selective engagement within said groove in order to lock said retaining pin in the bushing and for disengagement with said groove to unlock said retaining pin from said bushing.

2. A fastening element according to claim 1, wherein said locking element further comprises a transverse pin, the dowel-like bushing having a substantially radial guideway for guiding said transverse pin.

3. A fastening element according to claim 1 wherein the member further comprises having a blind hole with a bottom, said blind hole being open towards the bushing axial bore, a compression spring bearing against said blind hole bottom and on the locking element.

4. A fastening element according to claim 1 wherein said bushing further comprises an inclination guideway that inclines from the section of the center axis of the axial dowel bore towards the end of the dowel bushing.

5. A fastening element according to claim 1 wherein the dowel bushing further comprises being separated in an axial center plane into two mirror-inverted parts, said parts being connected by a tenon-bore joint.

6. A fastening element according to claim 1 wherein said transverse groove further comprises being narrowed towards said base.

7. A fastening element for a member, the element having a dowel-like bushing which can be fixed in a bore formed in the fastening element wherein the bushing has an axial bore, an axially rotatable retaining pin having a slotted broadened head, the pin being supported in the bushing's axial bore and which can fix the member to be fastened between the slotted broadened head and the dowel bushing, comprising a shank for the retaining pin, said shank being provided with at least one substantially transversely extending groove having a base, a spring-loaded snap-in locking element for selective engagement within said groove in order to lock said retaining pin in the bushing and for disengagement with said groove to unlock said retaining pin from said bushing wherein said transverse groove for said retaining pin is curved in a sloping manner, said slope corresponding to a locking element disengagement therewith.

8. A fastening element for a member, the element having a dowel-like bushing which can be fixed in a bore formed in the fastening element wherein the bushing has an axial bore, an axially rotatable retaining pin having a slotted broadened head, the pin being supported in the bushing's axial bore and which can fix the member to be fastened between the slotted broadened head and the dowel bushing, comprising a shank for the retaining pin, said shank being provided with at least one substantially transversely extending groove having a base, a spring-loaded snap-in locking element for selective engagement within said groove in order to lock said retaining pin in the bushing and for disengagement with said groove to unlock said retaining pin from said bushing wherein said transverse groove further has an extension in a spiral shape that is inclined towards said groove end.

9. A fastening element for a member, the element having a dowel-like bushing which can be fixed in a bore formed in the fastening element wherein the bushing has an axial bore, an axially rotatable retaining pin having a slotted broadened head, the pin being supported in the bushing's axial bore and which can fix the member to be fastened between the slotted broadened head and the dowel bushing, comprising a shank for the retaining pin, said shank being provided with at least one substantially transversely extending groove having a base, a spring-loaded snap-in locking element for selective engagement within said groove in order to lock said retaining pin in the bushing and for disengagement with said groove to unlock said retaining pin from said bushing wherein the axial bore extends eccentrically relative to the axial bore of the dowel bushing said retaining pin shank being eccentric relative to the slotted retaining pin head, the head being a flush head and having a truncated part, and that the bore of the member to be fastened is provided with a reduced edge to said truncated part of the flush head.

10. A fastening element for a member, the element having a dowel-like bushing which can be fixed in a bore formed in the fastening element wherein the bushing has an axial bore, an axially rotatable retaining pin having a slotted broadened head, the pin being supported in the bushing's axial bore and which can fix the member to be fastened between the slotted broadened head and the dowel bushing, comprising a shank for the retaining pin, said shank being provided with at least one substantially transversely extending groove having a base, a spring-loaded snap-in locking element for selective engagement within said groove in order to lock said retaining pin in the bushing and for disengagement with said groove to unlock said retaining pin from said bushing further having a jacket partially surrounding said retaining pin, said jacket holding said retaining pin for axial rotation and restraining said retaining pin motion in an axial direction, said jacket having a cutout to uncover said transverse groove of the retaining pin, a stop, and a counterstop in the bore of the dowel bushing for combining with said stop to hold the retaining pin stationary at said counterstop.

11. A fastening element according to claim 10, wherein said stop further comprises a cut in said jacket, a cutout following said cut, said cutout extending freely toward an end of the retaining pin opposite to the head thereof, said cutout being carried out in a plane parallel to the pin axis.

12. A fastening element according to claim 10, wherein said counterstop further comprises a chord-like step formed in the bore of the dowel bushing.

13. A fastening element according to claim 10 further comprising a ring, a resilient leg at an angle relative to the plane of said ring, said dowel-like bushing bore having a ring groove formed therein to enable said resilient leg to bear upon the transverse pin.

14. A fastening element according to claim 10 wherein said jacket further comprises an annular bead for engaging a ring groove in the retaining pin.

15. A fastening element according to claim 10 wherein the head of the retaining pin has a radial extension, said radial extension having lateral step-like edges that form stops and a counterstop on the jacket for engaging said stops.

16. A fastening element for a member, the element having a dowel-like bushing which can be fixed in a bore formed in the fastening element wherein the bushing has an axial bore, an axially rotatable retaining pin having a slotted broadened head, the pin being supported in the bushing's axial bore and which can fix the member to be fastened between the slotted broadened head and the dowel bushing, comprising a shank for the retaining pin, said shank being provided with at least one groove having a base, a spring-loaded snap-in locking element for selective engagement within said groove in order to lock said retaining pin in the bushing and for disengagement with said groove to unlock said retaining pin from said bushing said retaining pin shank having an annular ring groove, at least one spring-biased snap-in locking element, the dowel bushing guiding said locking element so that it is substantially displaceable in the axial direction, that said retaining pin shank has a thread between the head and said ring groove, the bushing having a female thread for engagement with said threaded shank, which bushing is held stationary with respect to the edge of the bore of the member to be fastened.

17. A fastening element according to claim 16, wherein the dowel-like bushing further comprises two guideways, said guideways extending obliquely towards the end of the dowel bushing, wherein the dowel bore has a blind hole formed therein with a base, two pins transverse to the bore and spaced axially from said blind hole base, and a compression spring, said spring being clamped in between said blind hole base and said two transverse pins.

18. A fastening element according to claim 17, wherein said threaded bushing further comprises a collar, said collar being spaced axially from said blind hole base.

19. A fastening element according to claim 18, characterized in that the dowel bore further comprises stepped bore sections.

20. A fastening element according to claim 16, characterized in that the threaded bushing further comprises at one end at least one projection, said projection engaging a respective edge recess of the fastening bore of the member to be fastened.

* * * * *